Feb. 7, 1961  B. V. SHETTY  2,970,616
CONTROLLED POWDER ADDITION FUNNEL
Filed March 13, 1958
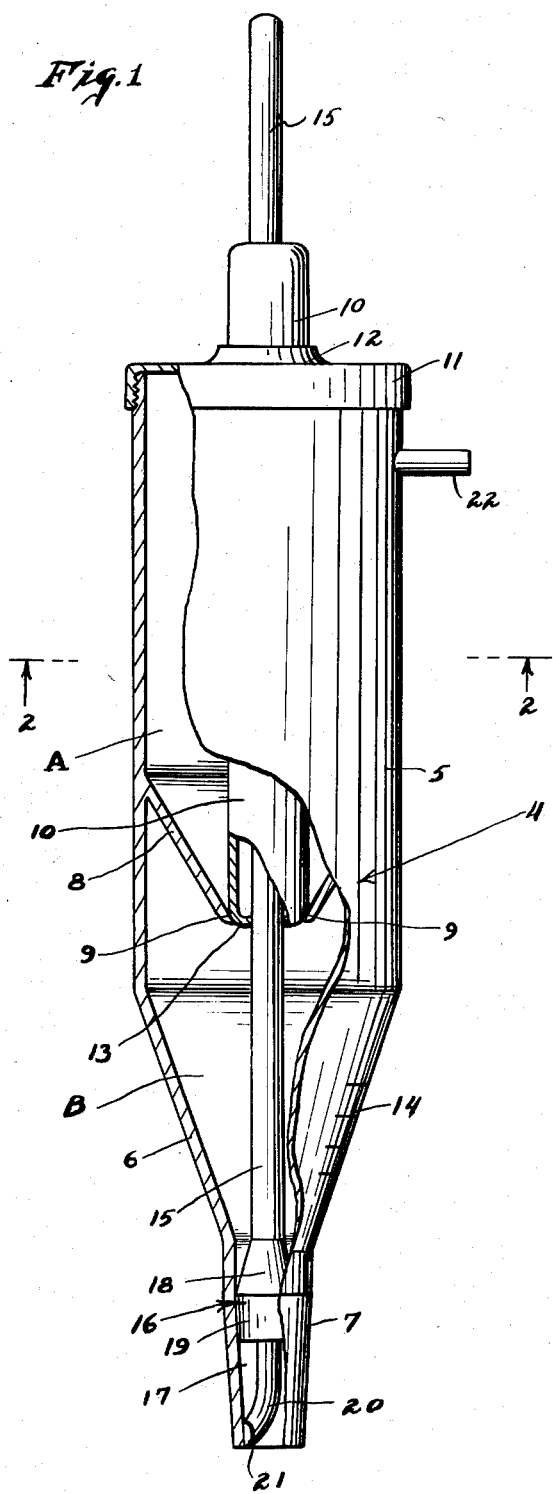
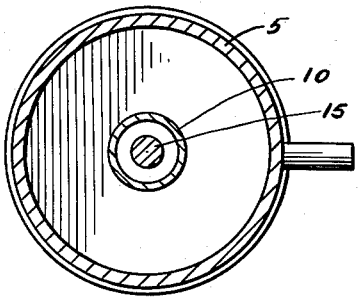
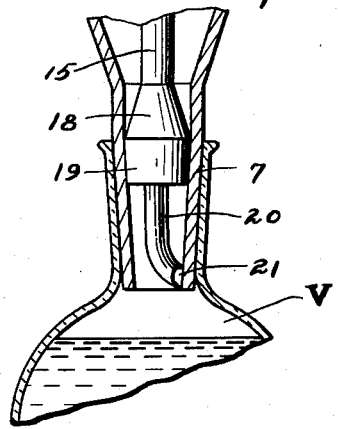
INVENTOR.
BOLA VITHAL SHETTY
BY Edmund H. O'Brien
ATTORNEY

United States Patent Office 2,970,616
Patented Feb. 7, 1961

---

2,970,616

CONTROLLED POWDER ADDITION FUNNEL

Bola Vithal Shetty, Philadelphia, Pa., assignor to American Home Products Corporation, New York, N.Y., a corporation of Delaware Filed Mar. 13, 1958, Ser. No. 721,294

3 Claims. (Cl. 141—344)

This invention relates to a controlled powder addition funnel which is useful for transferring a predetermined amount of a powdered material into a receptacle therefor.

The novel funnel is especially useful for transferring a predetermined amount of a powdered material, such as a powdered solid to be utilized as a reagent in a chemical reaction, into the reaction vessel in which the chemical reaction is to be carried out; and my improved apparatus is so constructed to permit carrying out the transference so that the rate of addition of the reagent to the reaction may be carefully controlled.

It is accordingly one of the objects of my invention to provide a controlled powder addition funnel of a new and improved construction which permits the transference, at will, of a measured amount of a powdered solid material such, for example as a powdered solid material which is to be utilized as a reagent in a chemical reaction, into the reaction vessel utilized for carrying out the chemical reaction, or into some other receptacle or container for the material, as the person operating the funnel may choose or select.

Another object of my invention is to provide a controlled powder addition funnel so arranged and constructed that the powdered solid material which is to be introduced into another vessel or container by means of the funnel may be transferred, either slowly or rapidly, as desired, the rate at which the powdered material is transferred being readily controlled by the operator.

It is still another object of my invention to provide a funnel of the described character, suitable for effecting transference of measured amounts of a powdered material, which funnel includes a device to prevent clogging of the funnel outlet, and which permits scraping off from the walls of the funnel any powdered material adhering to said walls adjacent the funnel outlet, whereby all of the measured quantity of the powdered material may be transferred to the reaction vessel or other receptacle therefor.

A further object of my invention is to provide a controlled powder addition funnel wherein the powdered solid being transferred, to a vessel in which a chemical reaction is to be carried out, or to some other container or receptacle, may be maintained under an atmosphere of inert gas during the entire transferring process.

The foregoing objects of my invention, as well as various other aims and objectives thereof, will be apparent from the ensuing disclosure of a preferred embodiment of the best mode contemplated for carrying out the invention.

My invention can best be described with reference to the annexed drawing wherein:

Figure 1 is a view in elevation of a controlled powder addition funnel, some portions of the apparatus being broken away so that the interior construction is partially exposed;

Figure 2 is a cross-sectional view taken along the line 2—2 of Fig. 1, looking upwardly, in the direction indicated by the arrows; and Figure 3 is a partial view showing the lower portion of the apparatus and the receptacle with which the funnel is in communication, whereby powdered material may be transferred to said receptacle.

The controlled powder addition funnel, as herein described, may be constructed of various structural materials and in various sizes, depending on the volume of powdered solid material which it is to be capable of transferring form one receptacle to another.

For laboratory use, and for scientific use generally, it is preferably constructed of glass. However it may be formed of almost any other rigid material as, for example, various metals including nickel and brass, and various commercially available synthetic resins or plastics, such as polymerized methyl methacrylate, or polymerized styrene synthetic resins.

Neither the particular size or capacity of the apparatus, nor the material out of which it is constructed, are of controlling importance in connection with my apparatus. Ordinarily, however, for use in scientific laboratories, a transparent material such as glass, or a clear or semi-transparent synthetic resin such as some of the polymerized or copolymerized acrylates or methacrylates, are preferred as materials of construction. For industrial establishments where being able to see the powder being transferred is not of prime importance a more rugged material, such as any of the metals, or a corrosion resistant material such as porcelain or other ceramic product, may be more satisfactory for the apparatus.

Referring to the drawing, my improved powder addition funnel, especially suitable for transferring controlled amounts of a powdered material, includes the outer tubular member 4, which provides, in its upper chamber designated by the letter A, a reservoir for the powder, and in its lower chamber designated by the letter B, a funnel portion of progressively decreasing cross-sectional area for transferring the powdered material from the reservoir to the receptacle V, which receptacle may be a reaction vessel into which the powdered solid is to be transferred.

The tubular member 4 is formed with an upper, generally cylindrical portion designated by the numeral 5, and a lower tapered portion, circular in cross section, designated by the numeral 6. The lower end of this tapered portion 6, where it is intended for insertion into the neck of the receptacle (such as a flask or reaction vessel V) into which the powdered material is to be transferred, is formed as a ground and slightly tapered joint 7. This ground glass joint, when glass is the material out of which the funnel apparatus is constructed, will fit tightly into the neck of the reaction vessel V (or other receptacle) so that transfer of the powdered material without loss of any portion thereof, and without contact of the powder with the outside atmosphere during the transfer operation, can be accomplished without difficulty.

The interior of the tubular member 4 is divided into the two chambers previously mentioned, the upper reservoir A and the lower chamber B, by the downwardly tapered partition wall 8 constructed in frusto-conical form with the narrower lower end open to provide a valve seat, indicated generally at 9 (which numeral is also used to designate the valve opening), for the reservoir funnel valve member 10. This cylindrical valve member 10 is adapted to seat in and close the valve opening at the base of the tapering partition 8, thus closing off communication between chambers A and B. The partition 8 may be advantageously formed integrally with the rest of the tubular member 4.

The upper end of the tubular member 4 is closed by a centrally apertured lid 11. This lid is formed with a central aperture, and with an internally screw-threaded flange so that it may be retained on the top of the tubular member 4, effectively closing off the upper end thereof. The central aperture in the lid 11 is surrounded by a slightly elevated collar 12 which extends a small distance beyond the plane of the top of the lid. The interior surface of this collar forms part of the aperture in the lid 11, or is in communication therewith, and the cylindrical valve member 10 extends through the aperture. The interior surface of the collar 12 provides, in effect, a bearing surface for the cylindrical valve member 10.

This vertically displaceable cylindrical valve member 10, extending through the aperture in the lid 11, has its major portion within the reservoir chamber A, and its lower end rests against the valve seat 9 in the frusto-conical lower tapered portion 6, thus serving as a valve closure therefor. The lower edge portion of the valve member 10, adjacent the tapering frusto-conical partition 8, is turned inwardly at 13 to provide a rounded bearing portion which abuts against the valve seat 9, thus closing the valve to shut off communication between the chambers A and B when the valve member 10 is in place. When powdered material is to be transferred between chambers A and B the cylindrical valve member may be raised, thus opening the valve in the tapering partition 8 and permitting powdered material to drop into the lower chamber B.

As indicated at 14, the outside of the tapered frusto-conical portion 6 of the tubular member 4 is provided with a series of graduations or reference marks which may be used to estimate, with a fair degree of accuracy, the amount of powdered material in the lower chamber B.

Positioned within the cylindrical valve member 10, and extending throughout its entire length and protruding therefrom at each end, is a vertically-displaceable, longitudinally-extending valve rod 15, which is formed at its lower end with an enlarged portion 16. This enlarged portion acts as a valve closure controlling the flow of powdered material from chamber B into the discharge conduit or neck 17 formed within the tapered joint 7, and it fits closely within the lower extremity of tapered, frusto-conical portion 6. The valve rod 15 extends through the aperture at the bottom of valve member 10, within the inwardly turned edge portions 13, and it glides against these edges as it is raised and lowered with respect to the cylindrical valve member 10.

The enlarged portion of the valve rod 15 which forms the valve closure, at the bottom of the valve rod, is constructed in two portions; an upper tapered portion 18, enlarging downwardly; and a lower tapered portion 19 joined to tapered portion 18, this lower tapered portion being slightly tapered in a downward direction. As stated, the lower tapered portion 19 fits tightly within the discharge conduit 17, having the same downward taper as the latter, so that it effectively closes the interior of the lower extremity of the frusto-conical lower portion 6, which interior forms the discharge conduit 17.

Extending from the bottom of the lower tapered portion 19 is the scraper rod 20, which is curved at 21 so that it bears against the interior surfaces of the tapered frusto-conical portion 6 which form the discharge conduit or passageway 17, within the tapered joint 7. This scraper rod may conveniently be a glass rod of lesser diameter than that of valve rod 15.

The arrangement is such that when the rod 15 is rotated or tapped, any solid powdered material adhering to the interior surfaces within the tapered joint 7 is shaken loose and allowed to drop into the receptacle V with which the funnel apparatus is in communication. As previously explained, the tapered joint 7 is inserted in the neck opening of such a flask, bottle or container V, as shown in Fig. 3.

The reservoir A is placed in communication with the outer atmosphere, or with a supply of inert gas, by means of gas inlet pipe 22 inserted in and secured to the upper portion of the tubular member 4. By connecting this gas inlet pipe with a source of inert gas, such as a cylinder of nitrogen, it is possible to flush the interior of the apparatus, thereby providing an inert atmosphere of nitrogen in both chambers. This is of importance when the solid powdered material being transferred is a substance which might react with, or be chemically affected by, the oxygen in the atmosphere if the entire apparatus were left in communication with the outside air.

The operation of my controlled powder addition funnel will be evident from its construction. If an atmosphere of dry inert gas is desired, the apparatus is first flushed out with an inert gas by connecting the apparatus through the gas inlet pipe 21 with a source of the gas. The valve rod 15 and the cylindrical valve member 10 are raised to allow free communication between the chambers A and B and out of the apparatus through discharge conduit 17.

The supply of gas is then stopped and the cylindrical valve member 10 and valve rod 15 allowed to fall back into position so that the valve 9 and the discharge conduit 17 are both closed. The lid 11 is then removed or displaced sufficiently to permit filling the reservoir chamber A with the powdered material which is to be fed into the receptacle V, such as a reaction vessel or other container, with which the funnel apparatus is in communication.

By lifting the cylindrical valve member 10, thus opening valve 9 at the base of partition 8, it is then possible to transfer any desired amount of the powdered material in reservoir chamber A into the chamber B. Since each particular powdered material has its own characteristics, a close approximation of the amount allowed to fall into chamber B may be secured by noting the reference mark 14 opposite the top level of the column of introduced powdered material. Should a more accurate determination be necessary it is possible to calibrate the apparatus by first filling chamber B up to any particular reference or graduation mark 14, and then weighing the amount necessary to fill the chamber to this level.

By lifting the rod 15, thus permitting the chamber B to communicate with the discharge conduit 17, the powder in chamber B drops into the discharge conduit and out of the funnel apparatus into the receptacle V with which the funnel apparatus is in communication. Any of the powder which sticks to the sides of the discharge conduit 17, within the tapered joint 7, during this operation may be freed or pried loose, either by tapping the valve rod 15, or by rotating this rod, thus bringing the curved end 21 of the scraper rod 20 into contact with the interior of the discharge conduit. It is also possible to move rod 15 up and down so that all of the surface within the discharge conduit 17 may be subjected to the scraping action of the curved end 21. In this way caking or adherence of the powdered material within the discharge conduit is avoided, and all of the material is allowed to drop into the receptacle V.

I claim:

1. A controlled powder addition funnel which comprises, in combination: an outer tubular member formed with an upper, generally cylindrical portion, and with a tapered, frusto-conical lower portion, said frusto-conical lower portion being provided with graduation marks to indicate various volumes of material therewithin, and said tapered frusto-conical lower portion, at its lower extremity, being tapered so as to be capable of being seated in the neck opening of a receptacle with which said controlled powder addition funnel is in communication; an apertured lid positioned on and serving to close the upper portion of said tubular member; a frusto-conical dividing partition in said tubular member, said partition being provided with a valve opening in its lowermost portion, and said partition serving to divide the interior of said tubular member into an upper chamber which may be placed in communication with the outer atmosphere, and into a lower chamber which may be placed in communication with said receptacle; vertically displaceable valve means extending through the aperture in said lid and into said upper chamber, said valve means being adapted to fit in and close said valve opening in said partition, thereby controlling communication between said chambers; a longitudinally extending rod within said vertically displaceable valve means, said rod extending through both of said chambers, and being provided, at its lowermost end, with an enlarged portion acting as a valve closure means, said enlarged portion closely fitting within said lower extremity of said tapered, frusto-conical lower portion, but being displaceable vertically with respect thereto, thereby controlling the discharge of powder from said lower chamber; and a curved scraper rod extending from said enlarged portion of said rod into said lower extremity of said tapered frusto-conical lower portion, said scraper rod being formed with an outwardly-curved end portion adapted to contact the interior surface of said lower extremity, said graduation marks on said frusto-conical lower portion serving to permit estimating the quantity of powdered material which is discharged from said funnel into said receptacle with which it is in communication.

2. A controlled powder addition funnel which comprises, in combination: an outer tubular member provided with an upper, generally cylindrical portion and a tapered, frusto-conical lower portion, said frusto-conical lower portion at its lower extremity being tapered to seat in the neck opening of a receptacle with which said controlled powder addition funnel is in communication; a frusto-conical dividing partition in said generally cylindrical portion of said tubular member, said partition serving to divide the interior of said tubular member into two chambers including an upper chamber, which may be placed in contact with the outer atmosphere, and a lower chamber, which may be placed in communication with said receptacle, said partition being apertured at its lowermost portion, thereby providing a valve opening between said chambers; vertically displaceable valve means adapted to seat in said valve opening in said partition, thereby closing said valve opening, and being adapted upon vertical displacement to open said valve opening and permit communication between said chambers; a rotatable vertically displaceable, longitudinally extending rod the upper portion of which is positioned within said vertically displaceable valve means, said rod being formed at its lower end with an enlarged portion comprising valve closure means, said enlarged portion fitting closely within said lower extremity of said tapered, frusto-conical lower portion, but being displaceable vertically with respect thereto, thereby controlling the transfer of powder from said lower chamber to the receptacle in communication therewith; and a curved scraper rod extending from said enlarged portion of said rod into said lower extremity of said tapered frusto-conical lower portion, said scraper rod being formed with an outwardly curved end portion adapted to contact the interior surface of said lower extremity, said curved scraper rod being actuable upon rotation of said rod to scrape off material adhering to the interior surface of said lower extremity of said frusto-conical portion.

3. A controlled powder addition funnel which comprises, in combination: an outer tubular member provided with an upper, generally cylindrical portion and a tapered, frusto-conical lower portion, said frusto-conical lower portion at its lower extremity being tapered to seat in the neck opening of a receptacle with which said controlled powder addition funnel is in communication; a frusto-conical dividing partition in said generally cylindrical portion of said tubular member said partition serving to divide the interior of said tubular member into two chambers including an upper chamber, which may be placed in contact with the outer atmosphere, and a lower chamber, which may be placed in communication with said receptacle, said partition being apertured at its lowermost portion, thereby providing a valve opening between said chambers; vertically displaceable valve means adapted to seat in said valve opening in said partition, thereby closing said valve opening, and being adapted upon vertical displacement to open said valve opening and permit communication between said chambers; a rotatable vertically displaceable, longitudinally extending rod the upper portion of which is positioned within said vertically displaceable valve means, said rod being formed at its lower end with an enlarged portion comprising valve closure means, said enlarged portion closely fitting within said lower extremity of said tapered, frusto-conical lower portion, but being displaceable vertically with respect thereto, thereby controlling the transfer of powder from said lower chamber to the receptacle in communication therewith; a curved scraper rod extending from said enlarged portion of said rod into said lower extremity of said tapered frusto-conical lower portion, said scraper rod being formed with an outwardly-curved end portion adapted to contact the interior surface of said lower extremity whereby, upon rotation of said longitudinally-extending rod, material adhering to the interior surface of said lower extremity may be scraped off therefrom; and a conduit secured to said outer tubular member and communicating with said upper chamber, whereby the interior of said funnel, including both chambers formed therewithin, may be placed in communication with a source of inert gas.

References Cited in the file of this patent

UNITED STATES PATENTS

| | | |
|---|---|---|
| 485,545 | Holt | Nov. 1, 1892 |
| 824,831 | Sury | July 3, 1906 |
| 1,352,165 | Agrillo | Sept. 7, 1920 |
| 1,413,767 | Nutting | Apr. 25, 1922 |
| 2,283,230 | Rogers | May 19, 1942 |
| 2,315,865 | McBean | Apr. 6, 1943 |
| 2,779,358 | Fechheimer et al. | Jan. 27, 1957 |
| 2,868,246 | Nelson | Jan. 13, 1959 |